United States Patent [19]
Fenley

[11] Patent Number: 5,415,587
[45] Date of Patent: May 16, 1995

[54] FLEXIBLE COUPLING

[75] Inventor: Thomas D. Fenley, Perkasie, Pa.

[73] Assignee: J. L. Behmer Corporation, Perkasie, Pa.

[21] Appl. No.: 27,611

[22] Filed: Mar. 3, 1993

[51] Int. Cl.⁶ .............................................. F16D 3/28
[52] U.S. Cl. ..................... 464/71; 464/137; 464/147
[58] Field of Search ............... 464/71, 72, 98, 99, 464/100, 137, 147

[56] References Cited

U.S. PATENT DOCUMENTS

| | | | |
|---|---|---|---|
| 903,171 | 11/1908 | Callan | 464/137 X |
| 2,727,369 | 12/1955 | Fawick | 464/74 |
| 2,742,770 | 4/1956 | Graham | 464/71 |
| 4,033,144 | 7/1977 | Allen | 464/147 X |
| 4,460,345 | 7/1984 | Chivari | 464/147 X |
| 4,661,084 | 4/1987 | Federn | 464/100 X |
| 5,221,232 | 6/1993 | Nameny | 464/99 X |

FOREIGN PATENT DOCUMENTS 705074  3/1954  United Kingdom .................. 464/71

*Primary Examiner*—Daniel P. Stodola
*Assistant Examiner*—Eileen A. Dunn
*Attorney, Agent, or Firm*—Joseph W. Molasky & Associates

[57] ABSTRACT

A coupling for connecting two rotatable members in a manner to isolate the torsional vibrations in one member from the other member even where radial, angular and axial misalignment is present and is constantly varying between the two rotatable members. Torsional stiffness and damping can be readily and independently altered to accommodate any application.

19 Claims, 5 Drawing Sheets

FLEXIBLE COUPLING

BACKGROUND OF THE INVENTION

In the operation of various devices such as internal combustion engines, air compressors, and like machinery, undesirable torsional vibration on the rotating members will be present. There will also be present a degree of radial and angular vibration depending on the number and arrangement of components undergoing linear and oscillatory motion. In the case of internal combustion engines where the revolutions per minute can vary over a wide range, it is particularly difficult to directly and flexibly couple the output shaft member to an input shaft member which has a considerable moment of inertia and, at the same time, avoid resonant harmonic frequencies between the input and output members in applications where the magnitude of oscillation at resonance can be destructive. This problem becomes particularly critical where design criteria demand the use of a single cylinder, two-cycle engine that yields maximum horsepower for minimum weight in order to provide hand portability without vibrations beyond the coupling.

In these applications, there will be a minimum mass of crankshaft flywheel and counterweights and the engine RPM may inadvertently exceed 15,000 . Further, the engine itself will be suspended within and isolated from the unit frame and all other components by means of very flexible rubber mounts. Thus, the engine output shaft member is free to oscillate torsionally, radially, angularly, and axially with respect to the frame-mounted driven shaft member. Furthermore, the magnitude of these oscillations vary somewhat independently of each other as engine RPM and engine load vary independently. Resonant frequencies, harmonics, and parasitic oscillations may not always occur at specified points of engine RPM because of a varying engine load at these specified points. Thus, there is a need in the art to provide a flexible coupling which will operate under these critical conditions.

SUMMARY OF THE INVENTION

It is the general object of the invention to provide a flexible coupling of the above-indicated type which will flexibly and directly couple two rotating members transferring rotational energy from one member to the other, which coupling can operate satisfactorily in an application where one member is to have no or minimum induced energy or motion other than rotation and the other member may or will have motion and oscillation with any degree of freedom superimposed upon rotation.

Another object of the invention is to provide a flexible coupling of the above-indicated type which includes a plurality of flat torsion springs which may be added or subtracted to the coupling to alter the stiffness or softness of the torsional spring rate to suit many different applications.

Another object of the invention is to provide a flexible coupling of the indicated type comprising a plurality of spacer washers which may be added or subtracted to the coupling to alter the stiffness or softness of radial displacement independently of the torsional spring rate.

Another object of the invention is to provide a flexible coupling of the indicated type provided with Belleville springs which may be added or subtracted to the coupling to alter the degree of frictional damping to suit any application.

Another object of the invention is to provide a coupling of the indicated type constructed and arranged to ensure a degree of forced air cooling sufficient to prevent overheating of the components used for friction damping.

Another object of the present invention is to provide a flexible coupling of the indicated type constructed and arranged to store energy in the torsion springs during the power stroke of the engine and return this energy to the output shaft member between power strokes.

Another object of the invention is to provide a flexible coupling of the indicated type wherein the torsion springs are constructed and arranged to be stressed under torsion during normal operation but to become stressed under tension during abnormal operation to thereby ensure that the springs cannot be overstressed in torsion.

Another object of the invention is to provide a flexible coupling of the indicated type constructed and arranged to comprise a plurality of torsion springs which are provided with a preset twist in one direction whereby a greater amplitude of deflection in the direction of the power stroke under a linear rate is provided.

The above and other objects of the invention will be apparent from the following drawings and the detailed description of the preferred embodiment of the invention.

DETAILED DESCRIPTION OF THE PREFERRED EMBODIMENTS

Figure 1:
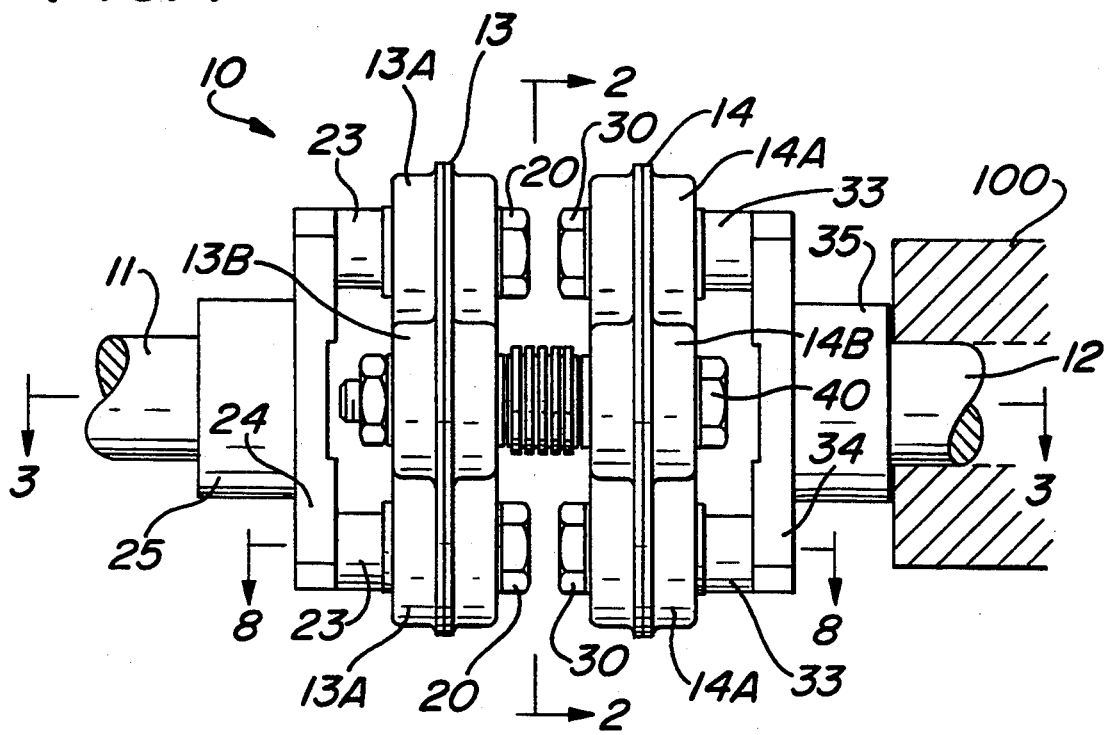
FIG. 1 is a side elevational view of a flexible coupling in accordance with the invention.

Referring to the drawings, there is shown a flexible coupling 10 for connecting two rotatable members in a manner to isolate the torsional vibrations in one member from the other member. Coupling 10 comprises a first hub means including an input hub 13 mounted on an input shaft 11 for rotation therewith, a second hub means including an output hub 14 mounted on an output shaft 12 for rotation therewith, and means for transmitting rotating movement between said first and second hub means.

Hub 13 has an annular configuration and includes a pair of enlarged portions 13A located at diametrically opposed locations. Hub 14 has a similar annular configuration to that of hub 13 and includes a pair of enlarged portions 14A located at diametrically opposed locations so as to be positionable opposite enlarged portions 13A of hub 13.

Figure 8:
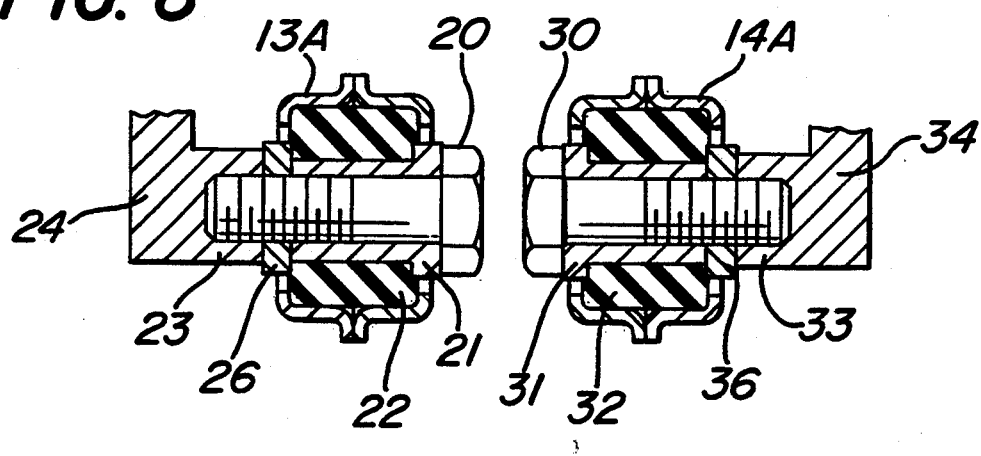
FIG. 8 is a fragmentary sectional view taken on line 8—8 of FIG. 1.

Means are provided for mounting hub 13 on the input shaft 11, such means comprising a pair of bolts 20, each of which has its shaft portion mounted, by means of a sleeve 21 and a washer 26, in a resilient rubber bushing 22 contained in an enlarged portion 13A. As best shown in FIG. 8, each bolt 20 has its bolthead located on one side of the associated enlarged portion 13A and its threaded end located on the other side thereof to extend therefrom toward input shaft 11. Each bolt 20 has its threaded end threadedly engaged in a projection 23 located at an outer end of a flange portion 24 of a drive member 25, which is mounted and secured on the end of input shaft 11 for rotation therewith by suitable means, such as a keyed arrangement 11A shown in FIG. 3.

Means are providing for mounting hub 14 on output shaft 12, such means comprising a pair of bolts 30 each of which has its shaft portion mounted, by means of a sleeve 31 and washer 36, in a resilient rubber bushing 32 contained in an enlarged portion 14A. As best shown in FIG. 8, each bolt 30 has its bolthead located on one side of enlarged portion 14A and its threaded end located on the other side thereof and extending therefrom toward output shaft 12. Each bolt 30 has its threaded end threadedly engaged in a projection 33 located at an outer end of a flange portion 34 of a drive member 35, which is mounted and secured on the end of output shaft 12 for rotation therewith by suitable means, such as a keyed arrangement 12A shown in FIG. 3.

Although rubber bushings 22 and 32 are resilient and provide the required amount of stiffness in axial and angular displacement, it is noted that since the bolts 20 and 30 are tightly secured in engagement with the flange portion 24 and 34 of drive members 25 and 35, respectively, bolts 20 and 30 do not allow the required degree of radial or torsional displacement through their respective bushings 21 and 31 under all conditions of operation. This movement will be accommodated by the arrangement involving the coupling members as will be described hereafter.

Figure 2:
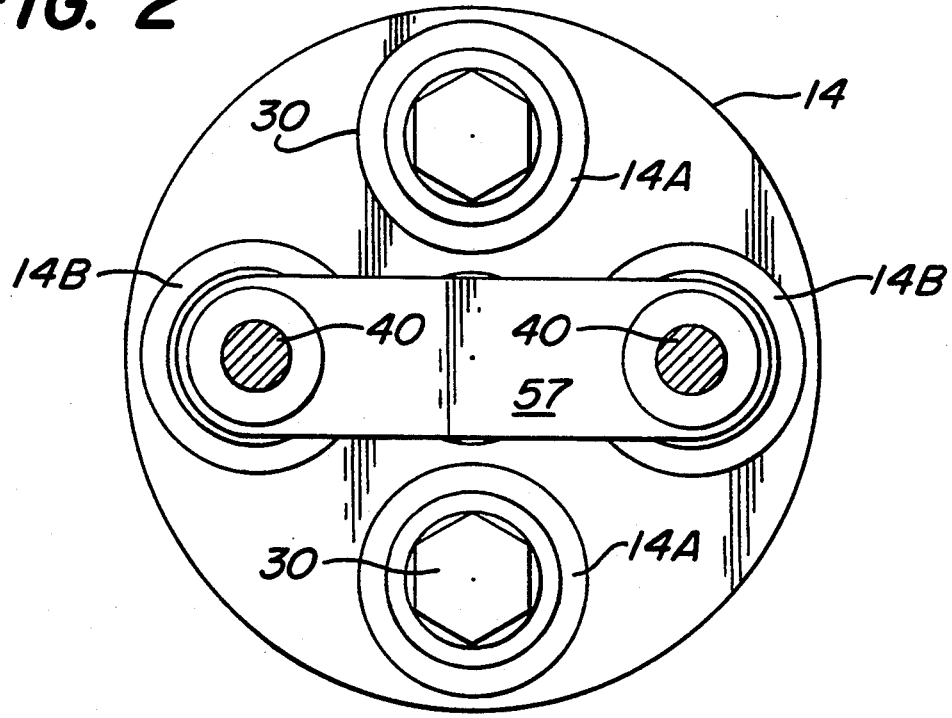
FIG. 2 is a sectional view taken generally on line 2—2 of FIG. 1.
Figure 3:
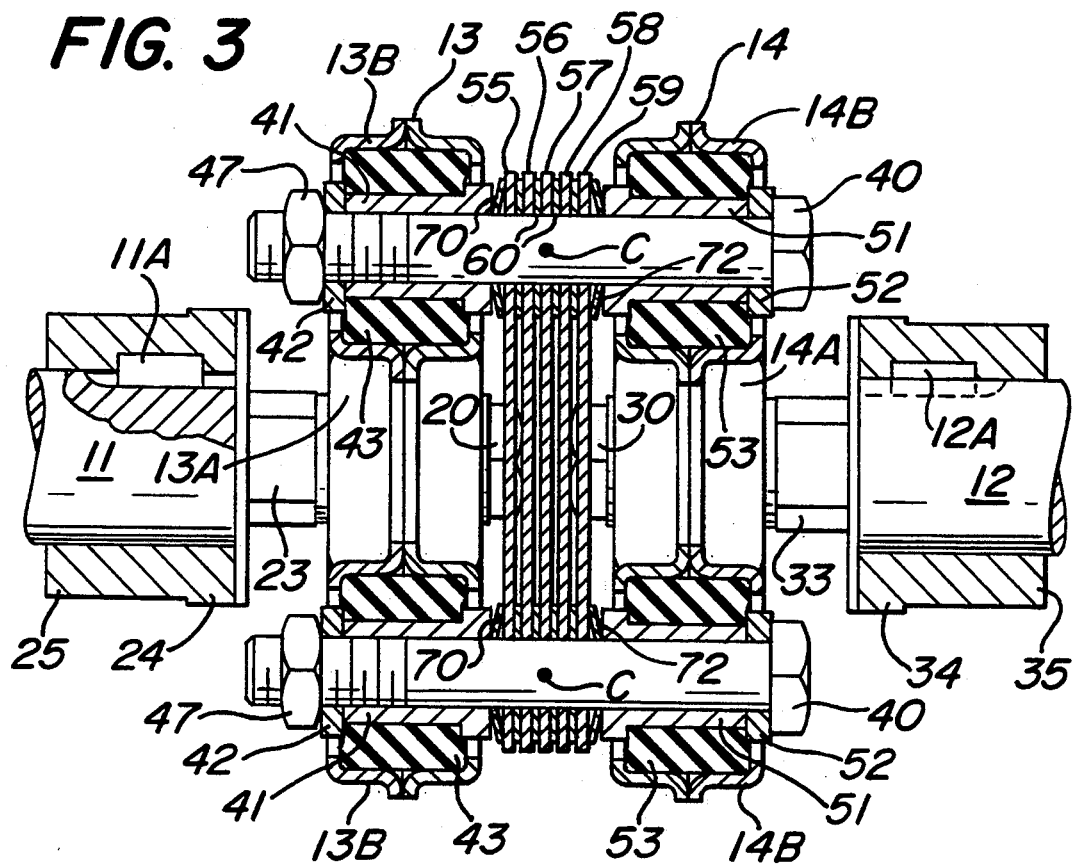
FIG. 3 is a sectional view taken generally on line 3—3 of FIG. 1.

The means for transmitting rotating movement between the first and second hub means comprises a pair of elongated coupling members in the form of a pair of torsion spring bolts 40. These spring bolts 40 are mounted to extend between hubs 13 and 14 for transmitting rotational movement therebetween, and each spring bolt 40 is received in a resilient mounting in each of the hubs 13 and 14 as best shown in FIG. 3. To this end, hub 13 is provided with a pair of enlarged portions 13B located at diametrically opposed locations circumferentially spaced an equal distance between enlarged portions 13A. Also, hub 14 is provided with a pair of enlarged portions 14B located at diametrically opposed locations spaced circumferentially an equal amount from enlarged portions 14A. This arrangement is illustrated in the drawings and reference is made to FIG. 2 to show the spacial relationship between bolts 40, which couple hubs 13 and 14, and the aligned bolts 20 and 30, which are engaged with input and output shafts 11 and 12 through drive members 25 and 35, respectively.

The enlarged portions 13B contain resilient mounting means for bolts 40, each mounting means comprising a sleeve 41, a washer 42, and a resilient rubber bushing 43 constructed and arranged as best shown in FIG. 3. The parts are constructed and arranged so that the threaded end portion of each bolt 40 extends through a sleeve 41 which is resiliently supported in a rubber bushing 43 to extend therefrom to be engaged with a nut 47 which is tightened against a washer 42 in contact with one end of the sleeve 41 in an arrangement as shown in FIG. 3.

The enlarged portions 14B contain resilient mounting means for the bolts 40, each mounting means comprising a sleeve 51, a washer 52, and a resilient rubber bushing 53 constructed and arranged as best shown in FIG. 3. The parts are constructed and arranged so that the portion of the shaft of each bolt 40 located near its bolthead extends through a washer 52 and a sleeve 51 to support this shaft portion in an arrangement as best shown in FIG. 3. The washers 52 are located between the boltheads of bolts 40 and the end of an associated sleeve 51.

The various bushings 22, 32, 43, and 53 described above may be made from neoprene spring rubber, polyurethane, or other suitable resilient material. Bolts 40 may be made from carbon alloy steel conforming to ASME/ANSI B18.2.1 and SAE J429, GRADE 8, or other suitable steel.

By reason of the above-described construction and arrangement, the bolts 40 are mounted to extend between hubs 13 and 14 with the end portions thereof supported in resilient mounting means in enlarged hub portions 13B and 14B.

Bolts 40 have medial shaft portions extending between the mounted end portions thereof as is best shown in FIG. 3. A plurality of flat torsion spring members 55–59 are arranged to extend between the medial shaft portions of bolts 40, as best shown in FIG. 3, with bolts 40 extending through circular holes 55′–59′ in said spring members 55–59, respectively, whereby each of the spring members 55–59 is engaged with said medial portions of said bolts at end portions of said spring members 55–59. Each of the spring members 55–59 is mounted to lie on a plane extending generally transversely to the axial extent of bolts 40, as is apparent from a consideration of the drawings. Spring members 55–59 are preferably made of 1070 spring steel and are suitably heat treated.

A plurality of spacer washers 60 are mounted on the medial shaft portions of each of the bolts 40, each of the four spacer washers 60 being located between the end portions of the five spring members 55–59 also engaged on said medial shaft portions. Thus, spacer washers 60 are arranged to provide spaces between said spring members 55–59 as is apparent from a consideration of the drawings. Spacer washers 60 are preferably made of a brake lining or clutch facing material to minimize the effects of friction induced heat and serve as friction washers to provide torsional vibration damping during operation of coupling 10.

A first pair of Belleville springs 70 are mounted on the medial shaft portion of each of the bolts 40, each spring 70 being arranged in compression between the end of a sleeve 41 and the outer surface of spring member 55. A second pair of Belleville springs 72 are mounted on the medial shaft portion of each bolt 40, each spring 72 being arranged in compression between the end of a sleeve 51 and the outer side of the spring member 59. By this arrangement, each cooperating pair of Belleville springs 70 and 72 mounted on a bolt 40 serves to apply a predetermined amount of pressure to the stack of spring members 55–59 and spacer washers 60. During the use of coupling 10, this pressure serves to control the degree of friction damping on torsional movement as well as the radial displacement of the spring members 55–59. Belleville springs 70 and 72 are preferably made of 1070 spring steel.

Figure 5:
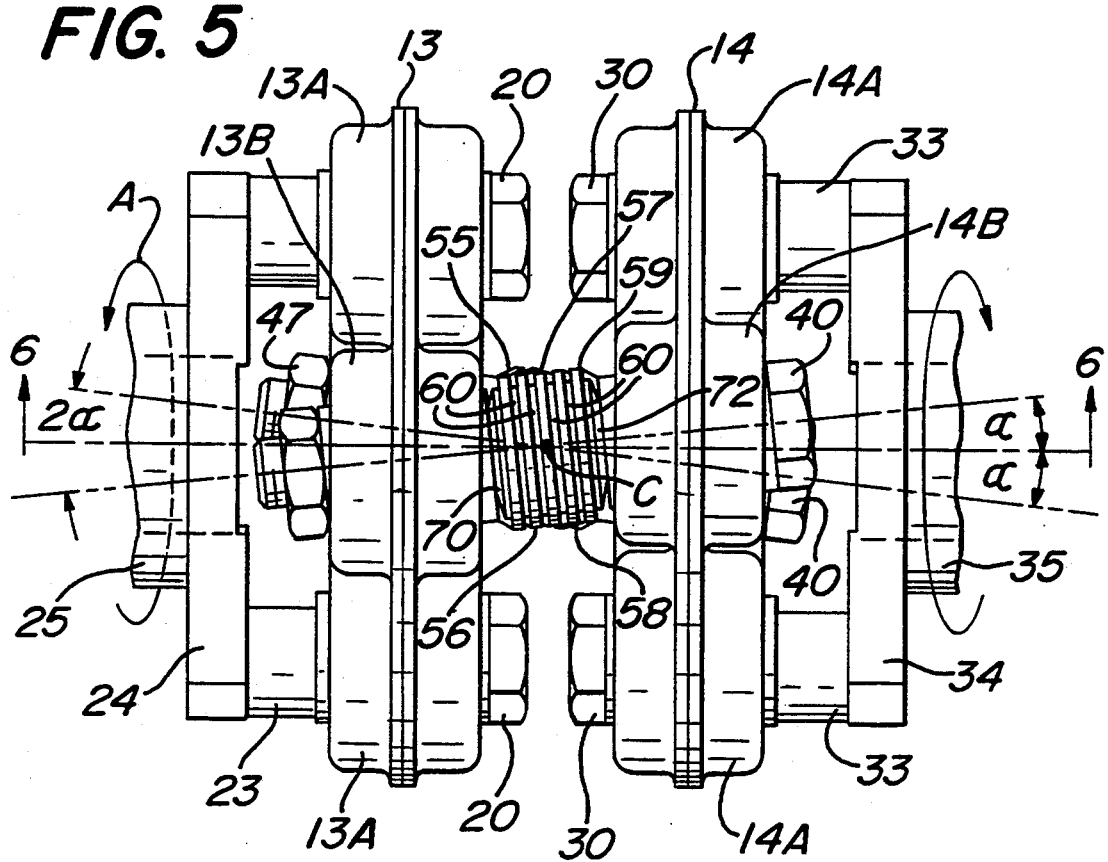
FIG. 5 is a side view similar to FIG. 1 but showing the condition of the parts with torsion applied as indicated by the arrows in FIG. 5.
Figure 4:
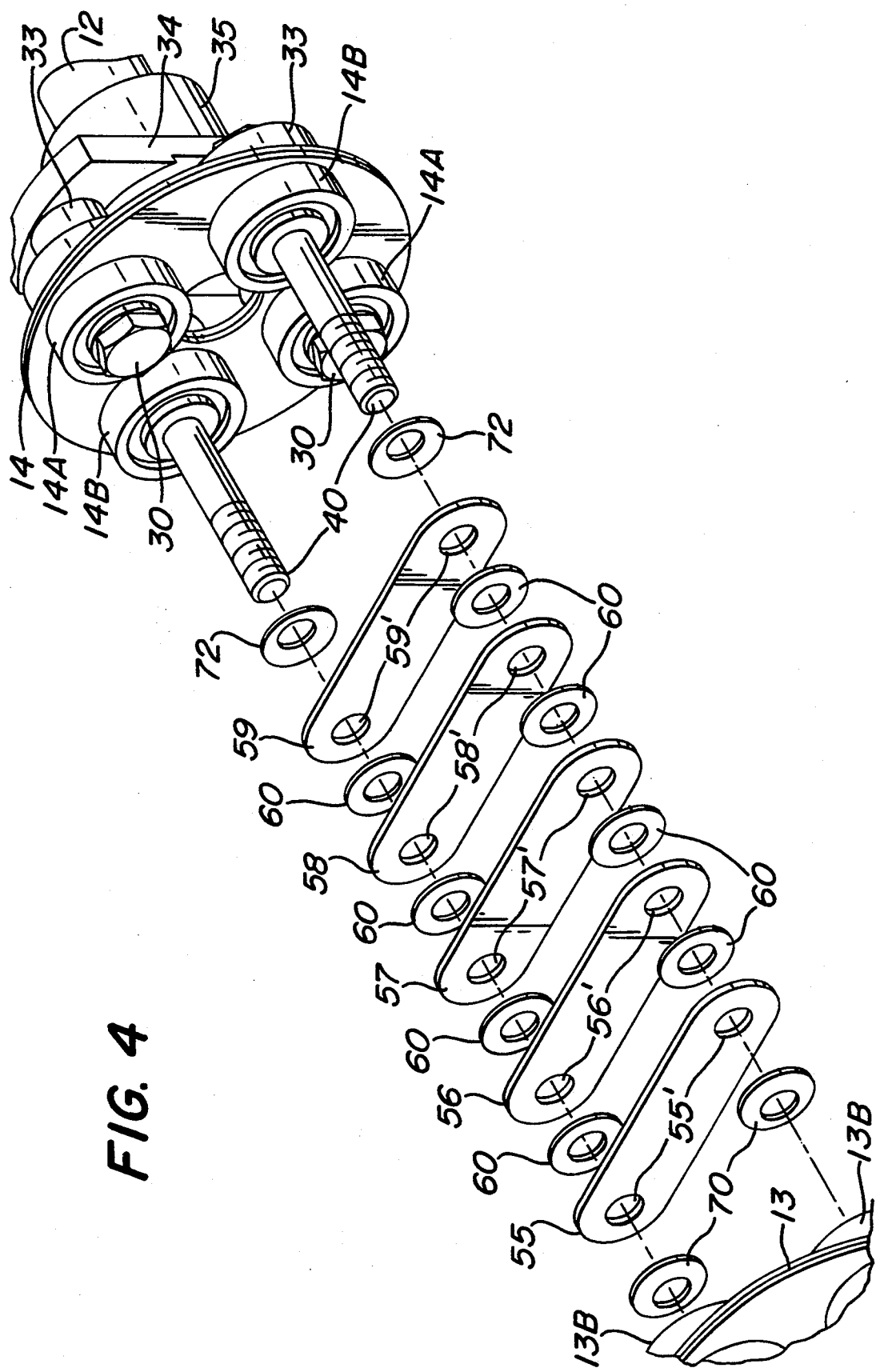
FIG. 4 is an exploded view illustrating the various parts of the flexible coupling in accordance with the invention.
Figure 6:
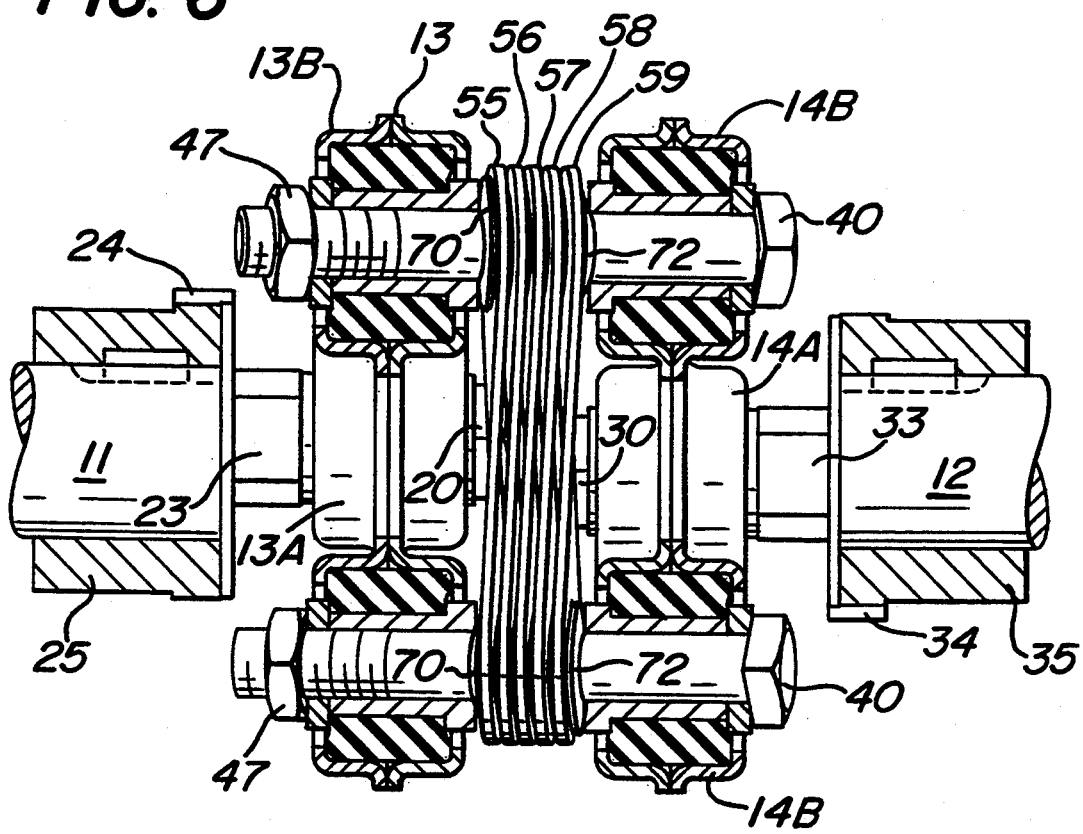
FIG. 6 is a sectional view of the coupling shown in FIG. 5 taken generally on line 6—6 of FIG. 5.

In the use of the coupling 10, the spring members 55–59 are constructed and arranged to control the movement of the coupling members, namely bolts 40, from a zero torque position as shown in FIG. 3, to a plurality of turned positions, such as the one shown in FIGS. 5 and 6. In each turned position, the longitudinal axis of each bolt 40 extends along one of a plurality of lines at angles to a first line extending along the bolt axis in the zero torque position. Each of the plurality of lines for a turned position of each bolt extends through a center located at a central point C on the medial shaft portion of each bolt 40 as is shown in FIG. 5.

It will also be noted that the plurality of spring members 55–59 are arranged symmetrically with respect to the central point C on the medial shaft portions of each of the coupling members or bolts 40. Thus, spring member 57 is located in alignment with central point C and the two spring members 55 and 56 are mounted symmetrically on one side of central point C and the two spring members 58 and 59 are mounted symmetrically on the other side of said central point C.

FIG. 5 shows the coupling 10 with torsion applied to shafts 11 and 12 as indicated by the arrows A and B. As is shown in FIG. 5, each hub 13 and 14 is deflected from a zero torque position through an angle $\alpha$. The total deflection of one hub with respect to the other is therefore equal to $2\alpha$ as is apparent from a consideration of FIG. 5.

Figure 7:
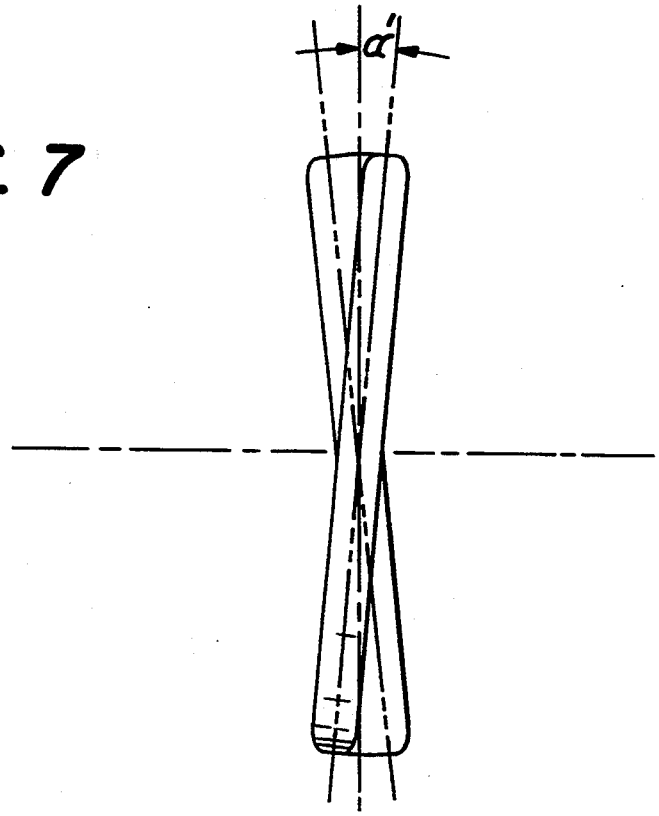
FIG. 7 is a detailed view of a torsion spring illustrating its condition as it is deflected in response to torsional forces.

As the bolts 40 move from a zero torque position to a turned position thereof as described above, the spring members 55 to 57 will control the bolt movement and will be moved from a zero torque position in which they extend in planes transverse to the axis of bolts 40 (as shown in FIGS. 1 and 3) to twisted positions such as the one in FIGS. 5 and 6. The Belleville springs 70 and 72 acting on the ends of spring members 55–59 provide a friction force to resist this twisting or deflecting movement of the spring members 55 to 59. FIG. 7 shows a section of a spring member as it is deflected between the Belleville washers 70 and 72 in response to a torsional movement such as that shown in FIG. 5. As FIG. 7 shows, the angle $\alpha'$ will be the same magnitude as the angle $\alpha'$ as shown in FIG. 5 for small angles of deflection. For greater angles of $\alpha$, the angle $\alpha'$ may actually be smaller than angle $\alpha$, which occurs when the stress on spring members 55–59 goes from torsion to tension.

In a typical application of the invention, the flexible coupling 10 is used in an arrangement wherein the input shaft 11 will be the output shaft of a single cylinder-two cycle internal combustion engine and the output shaft 12 will be the input shaft of a rotating field of a three phase alternator. The internal combustion engine and the three phase alternator are not shown in the drawings. In a typical arrangement, the internal combustion engine is mounted to the machine frame with flexible rubber engine mounts providing all degrees of freedom of movement and the alternator is rigidly mounted to the machine frame with no degree of freedom of movement. Thus, as shown in FIG. 1, there is provided a frame 100 which supports the output shaft 12 in a manner to restrict the degree of movement of the output shaft 12 as discussed above.

In this type of use for the flexible coupling 10, the three phase alternator presents a load to the internal combustion engine through the coupling 10. The moment of inertia of the rotating field is much greater than the moment of inertia of the two cycle internal combustion engine. The power impulses of the internal combustion engine, which occur every revolution, have a duration of less than one half of a revolution, and therefore, it presents to the hub 13 a power impulse or a peak torque that is much greater than the average torque supplied by the coupling output hub 14 to the input shaft of the alternator, namely, shaft 12. Further, the peak internal combustion engine output torque in excess of average torque will cause an angular displacement between input hub 13 and output hub 14 of the coupling 10, which displacement, in the illustrated embodiment, is equal to $2\alpha$, as shown in FIG. 5. During use, torsion spring members 55–59 will be displaced from the zero torque position shown in FIG. 3 to a plurality of positions such as the position shown in FIGS. 5 and 6. During this movement, the torsion spring members 55–59 will store energy when the internal combustion engine peak torque is above average and release said stored energy to the hub 13 when the internal combustion engine output torque is below average.

It will be noted that while five torsion spring members 55–59 are employed in the embodiment of the invention shown in FIGS. 1–8, there may be provided more or fewer spring members in order to suit the conditions dictated by the internal combustion engine, the alternator and other operating conditions. Also, the thickness and width of the torsion spring members 55–59 may also be varied to suit a particular application. Furthermore, some of the torsion spring members 55–59 may be replaced with various combinations of steel spacer washers (not shown), springs 70 and 72, and additional friction washers 60 if desired.

It will be noted that in the assembly of the coupling 10 the four bolts 20 and 30 are tightened securely into their respective flange portions 24 and 34 of drive members 25 and 35 and, therefore, do not allow the required degree of radial or torsional displacement through their respective resilient mountings. However, torsion spring bolts 40 are not tightened into any rigid member, but are engaged with friction nuts 47 to flatten the Belleville springs 70 and 72. This arrangement allows the regular hub displacement $\alpha$ to be restrained in all directions primarily by the stiffness of the torsion spring members 55–59 and only very slightly by the resilient rubber bushings 43 and 53. The length of the bolts 40 controls primarily the radial stiffness of the coupling 10 which can be varied by providing a desired number of spacer washers 60 placed between the Belleville springs 70 and 72 and the associated sleeves 41 and 51. At the same time, the torsion spring members 55–59 control primarily the torsional stiffness of the coupling 10. Accordingly, each of these parameters can be controlled somewhat independently. Further, the Belleville springs 70 and 72 determine the pressure on the friction washers 60 to thereby control the degree of friction damping on torsional displacement as well as radial displacement.

It should be noted that the diameter of the circular holes 55'–59' in spring members 55–59, respectively, through which the medial shaft portion of each bolt 40 extends are formed so as to provide approximately 0.001 inches to 0.002 inches of clearance therebetween. This clearance provides for a linear relationship between $\alpha$ and $\alpha'$ for torque applied with small angles of $\alpha$. However, as the torque, and hence α, are further increased, the bolts 40 will be angled an additional distance out of the neutral plane than that shown in FIGS. 5 and 6. By reason of the construction of the coupling 10, the distance between bolts 40 is held constant by the center spring 57 while bolts 40 become farther apart where end springs 55 and 59 are located. When the bolt shaft to hole clearance in holes 55', 59', and 57' is taken up by the movement of bolts 40 relative to the end spring members 55, 59, and the center spring member 57, further increases in torque, and hence an increase in α, will place the end springs 55 and 59 under tension and the center spring 57 under compression. Beyond this point, the relationship between applied torque and α and α' will then become exponential, i.e., torsional stiffness will increase rapidly and exponentially for a further increase in torque.

In the coupling 10, the torque versus α relationship remains linear for all normal loads and engine speeds. Also, friction damping would be set to prevent parasitic oscillations. However, in the event of abnormal conditions, such as rough idle, misfiring, parasitic oscillations, etc., peak torque and radial displacement could become excessive and destructive. In such an event, the torque versus α displacement would become exponential and torsional stress in the torsion spring members 55-59 would become tension and compression, as described above, thus preventing destructive peak torque overloads.

It is to be noted that the arrangement whereby washers 60 are positioned between the torsion spring members 55-59, as shown in the drawings, provides an additional feature during operation of the coupling 10. Washers 60 are designed with a predetermined thickness so as to provide an optimum space between the torsion spring members 55-59 for forced air cooling as the coupling 10 is rotated. The air cooling is achieved by means of the centrifugal force produced from rotation acting upon the air between the torsion spring members 55-59 during damping.

Figure 9:
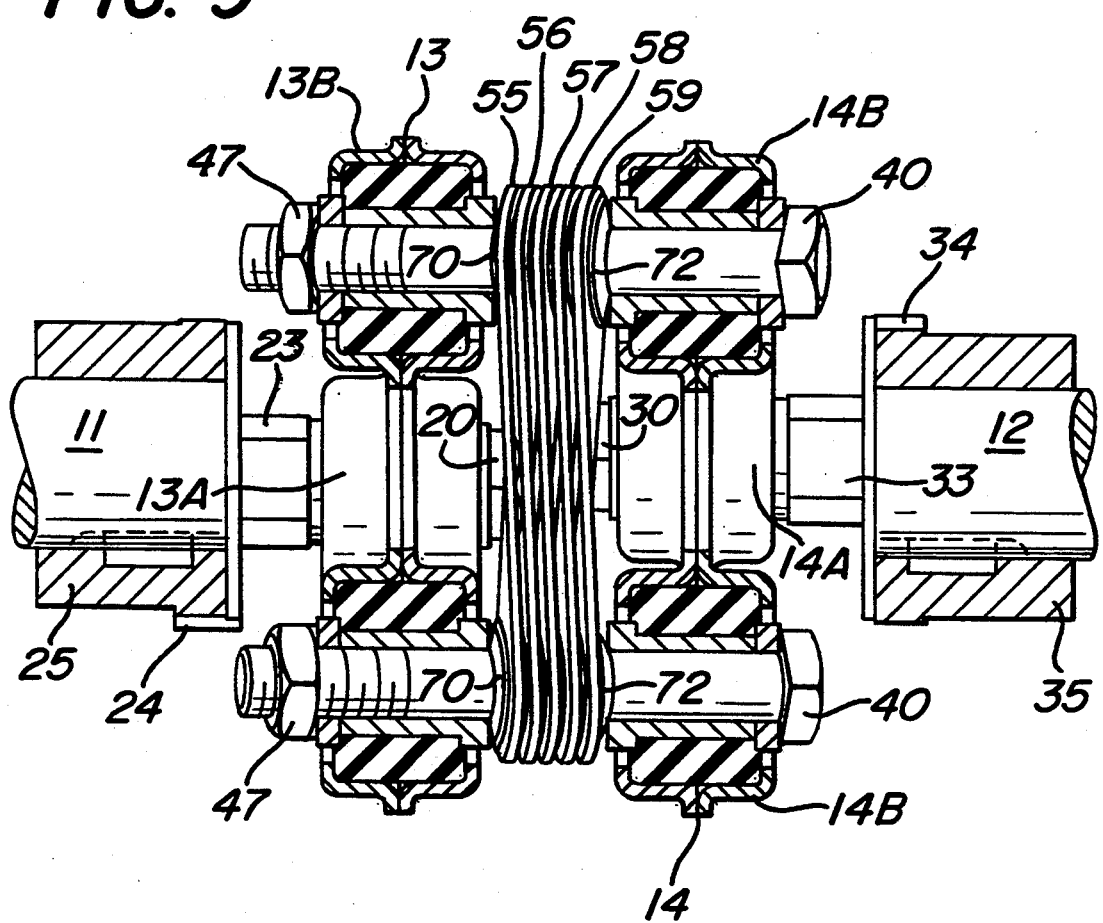
FIG. 9 is a view similar to FIG. 3 showing a second embodiment of the invention under static conditions with zero torsion applied.

In an application such as the one disclosed in the drawings, wherein the torque impulse under normal conditions is always in the same direction of rotation and the torsion spring members 55-59 will always be stressed in the same direction, another embodiment of the invention such as that shown in FIG. 9 may be employed. In this second embodiment of the invention shown in FIG. 9, the parts are the same as the embodiment of the invention shown in FIGS. 1-8 except that the torsion spring members 55-59 have a preset twisted configuration, and, more specifically, are preset with a negative "α" (as illustrated in FIG. 7) so that the average torque would produce an "α" of zero degrees allowing a greater amplitude of deflection in the plus "α" direction than in the negative "α" direction. Thus, in the use of the embodiment shown in FIG. 9, the torsion spring members 55-59 will move from a position as shown in FIG. 9 to a position as shown in FIG. 3 with average torque applied and may then, in response to a peak torque during a power stroke, move to a position as shown in FIGS. 5 and 6.

It will be apparent that various changes may be made in the construction and arrangement of parts without departing from the invention as defined by the scope of the following claims.

What is claimed is:

1. A coupling for connecting two axially aligned rotatable members in a manner to isolate the torsional vibrations in one member from the other member comprising
    a first hub,
    means for mounting said first hub on one of said rotatable members for rotation therewith,
    a second hub,
    means for mounting said second hub on the other of said rotatable members for rotation therewith, said second hub mounting means being constructed and arranged to mount said second hub opposite said first hub, and
    means for transmitting rotating movement between said first hub and said second hub including
    a pair of elongated coupling members mounted to extend axially between said first hub and said second hub, said coupling members each having a medial portion and a pair of end portions,
    resilient supports for mounting each of the end portions of said coupling members in one of said hubs, and
    a plurality of spring members extending in side-by-side relation to each other between said medial portions of said coupling members, said spring members having end portions engaged with said medial portions of said coupling members,
    said coupling having a zero torque position,
    each of said spring members comprising a strip of flexible material being mounted to extend generally transversely to the longitudinal axes of said coupling members in the zero torque position of said coupling,
    said spring members being constructed and arranged to control the movement of said coupling members by twisting in response to the movement of said coupling members and said hubs caused by torsional vibrations acting on said hubs during the transmitting of rotation between said rotatable members.

2. A coupling according to claim 1 wherein one of said rotatable members is an input member and the other of said rotatable members is an output member, one of said rotatable members being mounted to have no or minimum induced energy or motion other than rotation and the other of said members being mounted to permit motion and oscillation with any degree of freedom superimposed upon rotation.

3. A coupling according to claim 1 wherein the longitudinal axis of each coupling member extends along a first line in said zero torque position of said coupling,
    said spring members being constructed and arranged to control the movement of said coupling members from the zero torque position thereof to a plurality of turned positions wherein said longitudinal axis of each coupling member extends along a plurality of lines at angles to the first line thereof, each of said plurality of lines for each coupling member extending through a center located at a central point of said medial portion of each said coupling member, said spring members being twisted when said coupling members are moved to said turned positions.

4. A coupling according to claim 3 wherein said plurality of spring members are arranged symmetrically with respect to said central point on the medial portions of each of said coupling members so that the same number of spring members are located on each side of each of said central points.

5. A coupling according to claim 4 including a plurality of spacer washers mounted on said medial portion of each of said coupling members between and in friction contact with said end portions of said spring members engaged thereon to provide spaces between said side-by-side spring members.

6. A coupling according to claim 4 including a first spring loading means mounted on outer portions of said medial portion of one of said coupling members to urge together said end portions of said spring members engaged thereon, and a second spring loading means mounted on outer portions of said medial portion of the other of said coupling members to urge together said end portions of said spring members engaged thereon.

7. A coupling according to claim 6 wherein said first spring loading means comprises a first Belleville spring mounted in compression between said first hub and said end portion of a first one of said spring members engaged on said one coupling member and a second Belleville spring mounted in compression between said second hub and said end portion of a second one of said spring members engaged on said one coupling member, and said second spring loading means comprises a third Belleville spring mounted in compression between said first hub and said end portion of said first one of said spring members engaged on said other coupling member and a fourth Belleville spring mounted in compression between said second hub and said end portion of said second one of said spring members engaged on said other coupling member.

8. A coupling according to claim 7 including a plurality of spacer washers mounted on said medial portion of each of said coupling members between said end portions of said spring members engaged thereon to provide spaces between said spring members and in friction contact with said end portions of said spring members.

9. A coupling according to claim 4 wherein said plurality of spring members comprise a first end spring member engaged with said coupling members on one side of said central point on the medial portions of each of said coupling members and a second end spring member engaged with said coupling members on the other side of said central point on the medical portions of each of said coupling members.

10. A coupling according to claim 9 including a first spring loading means mounted on the outer portion of said medial portion of one of said coupling members to urge together said end portions of said spring members engaged thereon, and a second spring loading means mounted on the outer portion of said medial portion of the other of said coupling members to urge together said end portions of said spring members engaged thereon.

11. A coupling according to claim 10 wherein said first spring loading means comprises a first Belleville spring mounted in compression between said first hub and said end portion of a first one of said spring members engaged on said one coupling member and a second Belleville spring mounted in compression between said second hub and said end portion of a second one of said spring members engaged on said one coupling member, and said second spring loading means comprises a third Belleville spring mounted in compression between said first hub and said end portion of said first one of said spring members engaged on said other coupling member and a fourth Belleville spring mounted in compression between said second hub and said end portion of said second one of said spring members engaged on said other coupling member.

12. A coupling according to claim 1 wherein said means for mounting said first hub on one of said rotatable members comprises a resilient mounting for resiliently supporting said first hub on said one rotatable member so as to allow resilient relative movement therebetween, and said means for mounting said second hub on the other of said rotatable members comprises a resilient mounting for resiliently supporting said second hub on said other rotatable member so as to allow resilient relative movement therebetween.

13. A coupling according to claim 12 wherein said means for mounting said first hub on said one rotatable member comprises a pair of resilient bushings mounted at diametrically opposed positions of said first hub, and said means for mounting said second hub on the said other rotatable member comprises a pair of resilient bushings mounted at diametrically opposed positions on said second hub.

14. A coupling according to claim 12 wherein the longitudinal axis of each coupling member extends along a first line in the zero torque position of the coupling, said spring members being constructed and arranged to control the movement of said coupling members from said zero torque position thereof to a plurality of turned positions wherein said longitudinal axis of each coupling member extends along a plurality of lines at angles to the first line thereof, each of said plurality of lines for each coupling member extending through a center located at a central point of said medial portion of said coupling member, said spring members being twisted when said coupling members are moved to said turned positions.

15. A coupling according to claim 14 including a plurality of spacer washers mounted on said medial portion of each of said coupling members between said end portions of said spring members engaged thereon to provide spaces between said spring members.

16. A coupling according to claim 14 including a first spring loading means mounted on outer portions said medial portion of one of said coupling members to urge together said end portions of said spring members engaged thereon, and a second spring loading means mounted on outer portions said medial portion of the other of said coupling members to urge together said end portions of said spring members engaged thereon.

17. A coupling according to claim 16 wherein said first spring loading means comprises a first Belleville spring mounted in compression between said first hub and said end portion of a first one of said spring members engaged on said one coupling member and a second Belleville spring mounted in compression between said second hub means and said end portion of a second one of said spring members engaged on said one coupling member, and said second spring loading means comprises a third Belleville spring mounted in compression between said first hub and said end portion of said first one of said spring members engaged on said other coupling member and a fourth Belleville spring mounted in compression between said second hub and said end portion of said second one of said spring members engaged on said other coupling member.

18. A coupling for connecting two axially aligned rotatable members in a manner to isolate the torsional vibrations in one member from the other member comprising a first hub, means for mounting said first hub on one of said rotatable members for rotation therewith, a second hub, means for mounting said second hub on the other of said rotatable members for rotation therewith and in opposed relation to said first hub, and means for transmitting rotating movement between said first hub and second hub including a pair of elongated coupling members mounted to extend between said first hub and second hub, said coupling members each having a medial portion and a pair of end portions, resilient supports for mounting each of the end portions of said coupling members in one of said hubs, and a plurality of spring members extending between said medial portions of said coupling members and being engaged therewith at end portions of said spring members, each of said spring members comprising a strip of flexible material, said spring members being constructed and arranged to control the movement of said coupling members by twisting in response to the movement of said coupling members and said hubs caused by torsional vibrations acting on said hubs during the transmitting of rotation between said rotatable members, each of said spring members having a preset twisted configuration.

19. A coupling according to claim 18 wherein each of said spring members comprises a flat strip mounted to lie in a plane extending transversely through the longitudinal axes of said coupling members in the zero torque position of the coupling.

* * * * *